United States Patent
Miyazaki et al.

(10) Patent No.: US 8,661,884 B2
(45) Date of Patent: Mar. 4, 2014

(54) STROKE SENSOR ABNORMALITY DETERMINING APPARATUS

(75) Inventors: Tetsuya Miyazaki, Toyota (JP); Takayuki Yamamoto, Toyota (JP); Masaaki Komazawa, Toyota (JP); Yasushi Hanaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/812,939

(22) PCT Filed: Aug. 4, 2010

(86) PCT No.: PCT/JP2010/004915
§ 371 (c)(1), (2), (4) Date: Jan. 29, 2013

(87) PCT Pub. No.: WO2012/017482
PCT Pub. Date: Feb. 9, 2012

(65) Prior Publication Data
US 2013/0125638 A1 May 23, 2013

(51) Int. Cl.
*G01M 17/00* (2006.01)

(52) U.S. Cl.
USPC .......................................................... 73/132

(58) Field of Classification Search
USPC .......................................................... 73/132
See application file for complete search history.

(56) References Cited

U.S. PATENT DOCUMENTS

| 6,614,346 | B2 * | 9/2003 | Faye .............................. 340/453 |
| 8,091,356 | B2 * | 1/2012 | Isono et al. ..................... 60/552 |
| 8,201,896 | B2 * | 6/2012 | Ishizuka ....................... 303/122 |
| 8,244,430 | B2 * | 8/2012 | Izumikawa et al. .......... 701/34.4 |
| 2010/0131151 | A1 | 5/2010 | Izumikawa et al. |

FOREIGN PATENT DOCUMENTS

| JP | A-11-278228 | 10/1999 |
| JP | A-2007-112160 | 5/2007 |
| JP | A-2008-68747 | 3/2008 |
| JP | A-2009-12654 | 1/2009 |

* cited by examiner

Primary Examiner — Freddie Kirkland, III
(74) Attorney, Agent, or Firm — Oliff PLC

(57) ABSTRACT

A stroke sensor abnormality determining apparatus includes a stroke sensor for detecting a stroke of a brake pedal by detecting an electric signal that varies in response to the stroke of the brake pedal, a deceleration calculating unit for calculating a total target value, which is correlated with a target deceleration of a vehicle, based on at least the stroke, and an abnormality determining unit for determining whether or not an abnormality of the stroke sensor occurs, based on the electric signal detected by the stroke sensor, the abnormality determining unit being configured so that a signal indicating the abnormality of the stroke sensor can be outputted when the abnormality is determined to have occurred in the stroke sensor.

5 Claims, 10 Drawing Sheets

STROKE SENSOR ABNORMALITY DETERMINING APPARATUS

This application is a 35 U.S.C. 371 national phase application of International Patent Application No. PCT/JP2010/004915, filed on Aug. 4, 2010, the entire content of which is incorporated herein by reference.

TECHNICAL FIELD

The present invention relates to a stroke sensor abnormality determining apparatus and, more particularly, to a stroke sensor abnormality determining apparatus for determining whether or not there is any abnormality of a stroke sensor that detects the stroke of a brake pedal.

BACKGROUND TECHNOLOGY

A brake control apparatus conventionally known in the related art operates such that a target braking force is calculated from the stroke of a brake pedal or the master cylinder pressure and such that an on-off valve incorporated therein is controlled to generate a desired braking force by a wheel cylinder. Such an apparatus uses a stroke sensor to detect the stroke of the brake pedal.

When there is any abnormality of the stroke sensor provided for the brake control apparatus, however, it may sometimes be difficult to control the braking with high accuracy. Therefore, in the presence of any abnormality of the stroke sensor, it is considered necessary that the braking control be switched to another mode different from the ordinary mode.

However, the switching of braking control modes is not recommendable where improvement of brake feeling is a primary concern. Proposed as a solution to this problem is a stroke sensor abnormality determining apparatus that does not perform the detection of abnormality of the stroke sensor when the brake pedal is in a position near an end of pedal stroke. This contributes to an improvement on brake feeling (see Patent Document 1, for instance).

PRIOR ART DOCUMENTS

Patent Documents

[Patent Document 1] Japanese Unexamined Patent Application Publication No. 2009-12654.

SUMMARY OF THE INVENTION

Problems to be Solved by the Invention

The present invention has been made in view of the foregoing circumstances, and a purpose thereof is to provide a stroke sensor abnormality determining apparatus that contributes to further improvement of brake feeling.

In order to resolve the above-described problems, a stroke sensor abnormality determining apparatus according to one embodiment of the present invention includes: a stroke sensor configured to detect a stroke of a brake pedal by detecting an electric signal that varies in response to the stroke of the brake pedal; a deceleration calculating means for calculating a total target value, which is correlated with a target deceleration of a vehicle, based on at least the stroke; and an abnormality determining means for determining whether or not an abnormality of the stroke sensor occurs, based on the electric signal detected by the stroke sensor, the abnormality determining means being configured so that a signal indicating the abnormality of the stroke sensor can be outputted when the abnormality is determined to have occurred in the stroke sensor. When there is a change in the stroke and a change in the total target value is less than or equal to a predetermined threshold value or when a change in the total target value relative to a change in the stroke is less than or equal to a predetermined threshold value, the abnormality determining means does not output the signal indicating the abnormality of the stroke sensor.

Since, in a sliding type stroke sensor, brushes slide on resistors, there are cases where abrasion powder of the brushes and abrasion power of the resistors are accumulated between the brushes and the resistors. The abrasion power may adversely affect the relationship between the stroke of the brake pedal and the electric signals to be detected (e.g., voltage values) and therefore may possibly inhibit the abnormality of the stroke sensor from being properly determined. On the other hand, in the course of calculating the total target value that is correlated with the target deceleration of the vehicle, even if the stroke varies, the total target value may barely change according to a relationship between the stroke and the total target value. In such a case, there will be almost no effect on the precision and the change in the total target value even if the total target value is calculated based on the stroke detected by an abnormal stroke sensor. That is, there will be less or no need for changing the on-going braking control mode because the stroke sensor is determined to be abnormal. According to this embodiment, therefore, when there is a change in the stroke and a change in the total target value is less than or equal to the predetermined threshold value or when a change in the total target value relative to a change in the stroke is less than or equal to the predetermined threshold value, the abnormality determining means does not output the signal indicating the abnormality of the stroke sensor. This suppresses the unnecessary change of the braking control and reduces the strange brake feeling due to a change in the braking control, thereby contributing to further improvement of brake feeling. Note here that the "unnecessary change of the braking control" includes a case where the need to change the braking control is small.

Here, the "target value" is defined as a value correlated with the braking force, when the braking force (i.e., deceleration) required to stop the vehicle is to be calculated. More specifically, the "target values" as used herein may be indicators such as a target braking force, a target braking torque, and a target hydraulic pressure which are all related with the deceleration. Also, the "total target value" may be a value, correlated with the braking force, which is finally calculated based on one or more target values. Also, the case where "signal indicating the abnormality of the stroke sensor is not outputted" includes not only a case where the determination as to whether or not there occurs an abnormality of the stroke sensor is not made and the signal indicating the abnormality of the stroke sensor is not outputted but also a case where the determination as to whether or not there occurs an abnormality of the stroke sensor is temporarily made but the signal indicating its result is not outputted. Also, the "predetermined threshold values" is each set to an appropriate value through experiments or simulation runs. For example, the threshold value may be set according as whether or not the change in the total target value due to a change in the stroke affects the brake feeling.

Another embodiment of the present invention relates also to a stroke sensor abnormality determining apparatus. The apparatus includes: a stroke sensor configured to detect a stroke of a brake pedal by detecting an electric signal that varies in response to the stroke of the brake pedal; a deceleration calculating means for calculating a total target value, which is correlated with a target deceleration of a vehicle, based on at least the stroke; and an abnormality determining means for determining whether or not an abnormality of the stroke sensor occurs, based on the electric signal detected by the stroke sensor, the abnormality determining means being configured so that a signal indicating the abnormality of the stroke sensor can be outputted when the abnormality is determined to have occurred in the stroke sensor. When a function, correlated with the stroke, whose degree of contribution to the calculation of the total target value is less than or equal to a predetermined rate, the abnormality determining means does not output the signal indicating the abnormality of the stroke sensor.

As already mentioned, when the sliding type stroke sensor is used, the accumulated abrasion powder may adversely affect the relationship between the stroke of the brake pedal and the electric signals to be detected and may possibly inhibit the abnormality of the stroke sensor from being properly determined. On the other hand, if the effect of a stroke on the calculation of the total target value is practically nonexistent in the calculation of the total target value that is correlated with the target deceleration of the vehicle, the variation in the stroke will result in almost no change in the total target value. In such a case, there will be almost no effect on the precision and change in the total target value even if the total target value is calculated based on the stroke detected by an abnormal stroke sensor. That is, there will be less or no need for changing the on-going braking control mode because the stroke sensor is determined to be abnormal. According to this embodiment, therefore, when a function, correlated with the stroke, whose degree of contribution to the calculation of the total target value is less than or equal to a predetermined threshold value, the abnormality determining means does not output the signal indicating the abnormality of the stroke sensor. This suppresses the unnecessary change of the braking control and reduces the strange brake feeling due to a change in the braking control, thereby contributing to further improvement of brake feeling. Here, the "predetermined threshold rate" is set to an appropriate value through experiments or simulation runs. For example, in consideration of an effect of the contribution of a function, correlated with the stroke, on the total target value, the rate may be set according as whether or not the change in the total target value affects the brake feeling.

The deceleration calculating means adds up a first target value and a second target value at predetermined rates applied thereto, respectively, according to a condition, by using the first target value calculated based on the electric signal detected by the stroke sensor and the second target value calculated based on an electric signal detected by another sensor different from the stroke sensor; and, when the rate of the first target value used in calculating the total target value is a less than or equal to a predetermined threshold value, the abnormality determining means does not output the signal indicating the abnormality of the stroke sensor. This suppresses the unnecessary change of the braking control in the face of the occurrence of an abnormality of the stroke sensor. Also, since the total target value is calculated mainly based on the electric signals detected by the another sensor, the ordinary braking control can be maintained with accuracy.

The another sensor is a master pressure sensor for detecting the pressure of a master cylinder that generates a fluid pressure according to the stroke of the brake pedal.

Still another embodiment of the present invention relates also to a stroke sensor abnormality determining apparatus. The apparatus includes: a first stroke sensor configured to detect a first stroke of a brake pedal by detecting an electric signal that varies in response to the stroke of a brake pedal; a second stroke sensor configured to detect a second stroke of the brake pedal by detecting an electric signal that varies in response to the stroke of the brake pedal; a deceleration calculating means for calculating a total target value, which is correlated with a target deceleration of a vehicle, based on at least the first stroke and the second stroke; and an abnormality determining means for determining whether or not there occurs an abnormality of at least one of the first stroke sensor and the second stroke sensor occurs, based on the electric signals detected by the first stroke sensor and the second stroke sensor, respectively, the abnormality determining means being configured so that a signal indicating the abnormality of the stroke sensor can be outputted when the abnormality is determined to have occurred in at least one of the first stroke sensor and the second stroke sensor. The deceleration calculating means calculates a first target value, which is a function of the first stroke, whose saturation is at least defined and a second target value, which is a function of the second stroke, whose saturation is at least defined; and when a difference between the first target value and the second target value is less than or equal to a predetermined threshold value, the abnormality determining means does not output the signal indicating the abnormality of the stroke sensor. Here, the "saturation" indicates a relationship such that each target value becomes small, more preferably, becomes practically "0" relative to the change in the stroke.

As described above, when the sliding type stroke sensor is used, the accumulated abrasion powder may adversely affect the relationship between the stroke of the brake pedal and the electric signals to be detected and may possibly inhibit the abnormality of the stroke sensor from being properly determined. Thus, a plurality of stroke sensors are used, so that the abnormality of the stroke sensors can be easily determined. For example, if the respective electric signals of a plurality of stroke sensors are compared with each other and if the values thereof differ greatly, abnormality may be assumed to have occurred in at least one of the stroke sensors. At the same time, the stroke detected by each stroke sensor is also used in the calculation of the total target value correlated with the target deceleration of the vehicle, so that the total target value can be calculated accurately. The total target value is detected by using the first target value and the second target value, which are correlated with the stroke, for instance. If, in this case, the values of their electric signals or the values of their strokes differ greatly, an abnormality of either one of the sensors may be assumed.

If the first target value, which is a function of the first stroke, is a function whose saturation is at least defined, there will be a range over which the first target value relative to the change in the first stroke is almost constant. Similarly, if the second target value, which is a function of the second stroke, is a function whose saturation is at least defined, there will be a range over which the second target value relative to the change in the second stroke is almost constant. Note that the function of the first stroke and the function of the second stroke may be identical to each other. In these cases, even if there is a large difference in between the first stroke and the second stroke, no large difference will occur in the first target value and the second target value, respectively. In other words, if either the first stroke sensor or the second stroke sensor is abnormal and if there is a large difference in between the stroke detected by the normal stroke sensor and the stroke detected by the abnormal stroke sensor, the first target value and the second target value will be almost identical to each other. If so, there will be almost no effect on the precision in the total target value even if the total target value is calculated using a function of the stroke detected by the abnormal stroke sensor. Hence, there will be less or no need for changing the on-going braking control mode because the stroke sensor is determined to be abnormal. According to this embodiment, therefore, when the difference between the first target value and the second target value is less than or equal to the predetermined threshold value, the abnormality determining means does not output the signal indicating the abnormality of the stroke sensor. This suppresses the unnecessary change of the braking control and reduces the strange brake feeling due to a change in the braking control, thereby contributing to further improvement of brake feeling.

Optional combinations of the aforementioned constituting elements, and implementations of the invention in the form of methods, apparatuses, systems, and so forth may also be effective as additional modes of the present invention.

Effect of the Invention

The prevent invention provides a stroke sensor abnormality determining apparatus that contributes to further improvement of brake feeling.

BEST MODE FOR CARRYING OUT THE INVENTION

Figure 1:
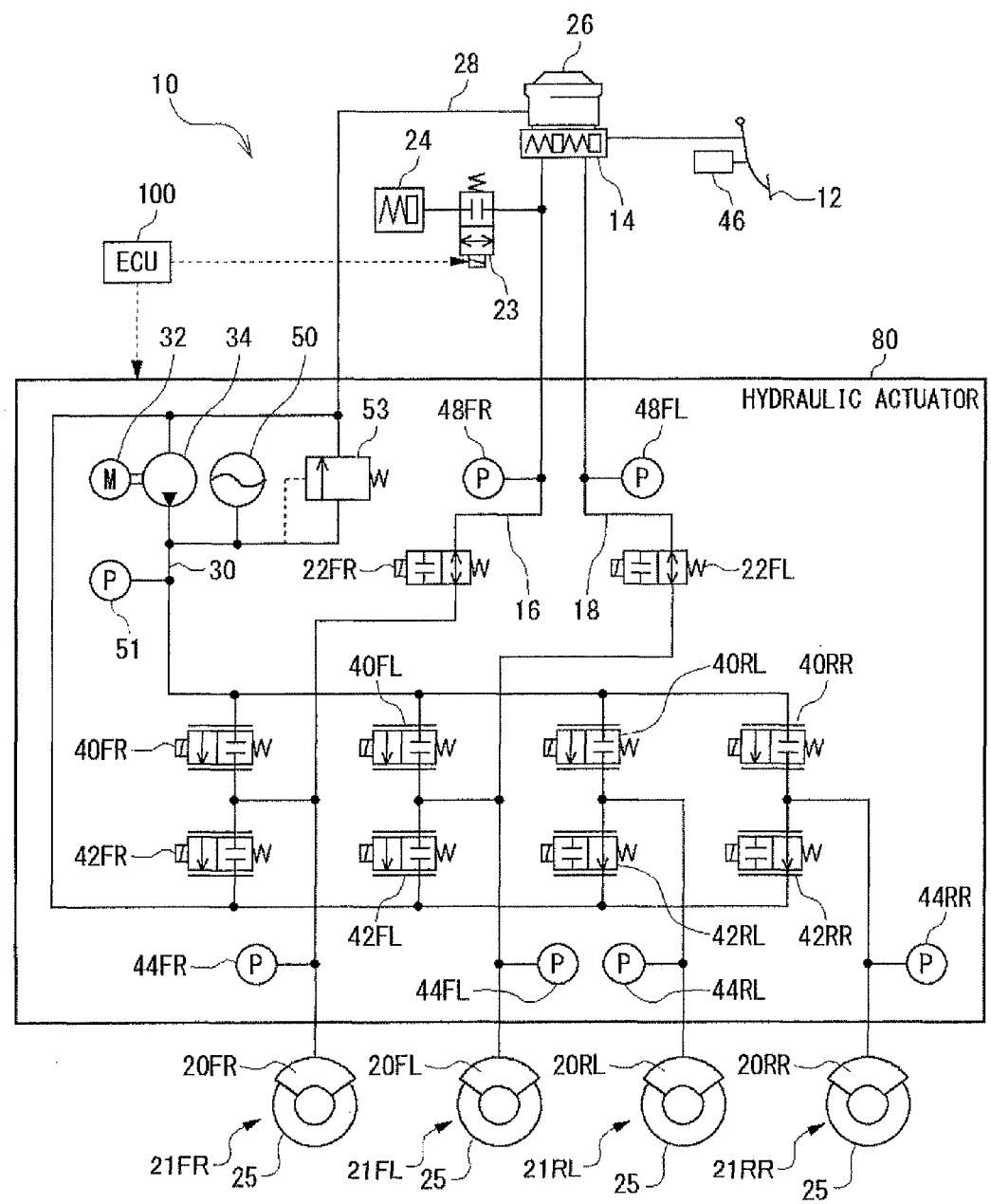
FIG. 1 is a system diagram showing a brake control apparatus according to a first embodiment of the present invention.

The preferred embodiments for carrying out the present invention will now be hereinbelow described in detail with reference to the accompanying drawing. Note that the identical components are given the identical reference numerals in all accompanying figures and that the repeated description thereof will be omitted as appropriate.

(First Embodiment)

FIG. 1 is a system diagram showing a brake control apparatus 10 according to a first embodiment of the present invention. The brake control apparatus 10 shown employs an electronically controlled brake (ECB) system and is capable of making independent and optimal settings for the brakes on the four wheels of a vehicle in response to a driver's operation of a brake pedal 12, which serves as a brake operation member. A vehicle equipped with the brake control apparatus 10 according to the present embodiment is provided with a not-shown steering apparatus for steering the steering wheels of the four wheels, not-shown running drive sources, such as an internal-combustion engine and a motor, for driving the drive wheels of the four wheels, and so forth.

The brake control apparatus 10 according to the present embodiment is mounted on a hybrid vehicle which is equipped with an electric motor and an internal-combustion engine, for instance, as the running drive sources. For such a hybrid vehicle, both the regenerative braking for braking the vehicle by regenerating the kinetic energy of the vehicle as electrical energy and the hydraulic braking effected by the brake control apparatus 10 can be used for the purpose of braking the vehicle. A vehicle according to the present embodiment can implement a regenerative-cooperative braking control in which a desired braking force is generated by a combined use of regenerative braking and hydraulic braking. An apparatus for generating a desired braking force by the user of hydraulic braking only may be used as the brake control apparatus 10.

Disk brake units 21FR, 21FL, 21RR and 21RL as braking force applying mechanisms apply braking force to a right front wheel, a left front wheel, a right rear wheel and a left rear wheel of a vehicle, respectively. The disk brake units 21FR to 21RL include their respective brake disks 25 and wheel cylinders 20FR to 20RL incorporated in their brake calipers. And the wheel cylinders 20FR to 20RL are connected to a hydraulic actuator 80 through their respective fluid passages. Hereinbelow, the wheel cylinders 20FR to 20RL will be generically referred to as "wheel cylinder 20" or "wheel cylinders 20" as appropriate.

In the brake control apparatus 10, the hydraulic actuator 80 is comprised of a right master cut valve 22FR, a left master cut valve 22FL, pressure increasing valves 40FR to 40RL, pressure reducing valves 42FR to 42RL, an oil pump 34, an accumulator 50 and the like, which will be described later. As a brake fluid is supplied to the wheel cylinder 20 from the hydraulic actuator 80, a brake pad serving as a friction member is pressed against the brake disk 25 rotating together with the wheel. Thereby, a braking force is applied to each of the wheels.

It should be noted that while the disk brake units 21FR to 21RL are used in the present embodiment, other braking force applying mechanisms including wheel cylinders 20, such as drum brakes, may be used also. Otherwise, braking force applying mechanisms that control the pressing force of the friction member against the wheel using an electromotive drive mechanism such as an electric motor may be used instead of those controlling the pressing force of the friction member by a fluid force.

The brake pedal 12 is connected to a master cylinder 14 which sends out brake fluid as the operating fluid in response to pedal operation by a driver. The master cylinder 14 generates a fluid pressure according to the stroke of the brake pedal. The brake pedal 12 is provided with a stroke sensor 46 for detecting the pedal stroke. The stroke sensor 46 is provided with sensors for two different systems; that is, it is the two-system sensors where two output systems are installed in parallel with each other. These two output systems in the stroke sensor 46 measure a pedal stroke independently and in parallel with each other and output their respective measurement results. Having a plurality of output systems like this allows the pedal stroke to be measured in the event that any one of them malfunctions. This is effective in enhancing the failsafe operation of the stroke sensor 46. If a plurality of measurement results from a plurality of output systems are all taken into consideration and then outputted by taking the average of them, for instance, as the output of the stroke sensor 46, a highly reliable output can generally be obtained.

The stroke sensor 46 may be a sliding type sensor, for instance. The sliding type stroke sensor 46 detects the stroke of the brake pedal 12 by sensing an electric signal that varies in response to the stroke of the brake pedal 12. The measured values outputted parallely from the respective output systems of the stroke sensor 46 are inputted to an electronic control unit (hereinafter referred to as "ECU") 100, for instance. And the ECU 100 calculates the stroke using the measured values inputted from the stroke sensor 46. The thus calculated stroke is used for the calculation of a target deceleration, for instance. The stroke sensor 46 may have three or more output systems in parallel. Also, the stroke sensor 46 may have a plurality of contacts and may be configured such that a plurality of measured values at said contacts are outputted parallely to the ECU 100 as if there were a plurality of sensors.

Connected to one of output ports of the master cylinder 14 is a stroke simulator 24 which creates a reaction force corresponding to an operating force exerted on the brake pedal 12 by the driver. A simulator cut valve 23 is provided midway in a flow passage connecting the master cylinder 14 to the stroke simulator 24. The simulator cut valve 23 is a normally-closed type electromagnetic on-off valve which is closed when power is not being applied and opened when the operation of the brake pedal 12 by the driver is detected. Note here, however, that it is not essential that the simulator cut valve 23 be installed; instead, the stroke simulator 24 may be connected directly to the master cylinder 14 without involving the simulator cut valve 23.

Further connected to the one of the output ports of the master cylinder 14 is a brake hydraulic control pipe 16 for the not-shown right front wheel, and the brake hydraulic control pipe 16 is connected to the wheel cylinder 20FR which applies a braking force to the right front wheel. Also, connected to the other of the output ports of the master cylinder 14 is a brake hydraulic control pipe 18 for the not-shown left front wheel, and the brake hydraulic control pipe 18 is connected to the wheel cylinder 20FL which applies a braking force to the left front wheel.

The right master cut valve 22FR is provided at a midway point of the brake hydraulic control pipe 16 for the right front wheel, whereas the left master cut valve 22FL is provided at a midway point of the brake hydraulic control pipe 18 for the left front wheel. Hereinbelow, the right master cut valve 22FR and the left master cut valve 22FL will be generically referred to as "master cut valve 22" or "master cut valves 22" as appropriate.

The master cut valve 22 provided with an on-off controlled solenoid and a spring is a normally-open type electromagnetic control valve which ensures a closed state by an electromagnetic force generated by the solenoid upon receiving a predetermined control current and remains open when power is not being applied to the solenoid. The master cut valves 22 in an open state allow the bi-directional flow of brake fluid between the master cylinder 14 and the wheel cylinder 20FR of the front wheel as well as between the master cylinder 14 and the wheel cylinder 20FL thereof. The flow of brake fluid is shut off when the master cut valve 22 is closed with the supply of the predetermined control current to the solenoid.

A right master pressure sensor 48FR for detecting a master cylinder pressure on a right front wheel side is provided at a midway point of the brake hydraulic control pipe 16 for the right front wheel, whereas a left master pressure sensor 48FL for measuring a master cylinder pressure on a left front wheel side is provided at a midway point of the brake hydraulic control pipe 18 for the left front wheel. In the brake control apparatus 10, when the brake pedal 12 is stepped on by the driver, the stroke sensor 46 detects the amount of pedal operation. However, it is also possible to obtain the pedal operating force (pedaling force) applied to the brake pedal 12 from the master cylinder pressure detected by the right master pressure sensor 48FR and the left master pressure sensor 48FL. Therefore, it is preferable from a failsafe point of view that the master cylinder pressure is monitored by the two pressure sensors 48FR and 48FL by assuming the failure of the stroke sensor 46. Hereinbelow, the right master pressure sensor 48FR and the left master pressure sensor 48FL will be generically referred to as "master pressure sensor 48" or "master pressure sensors 48" as appropriate.

Also, connected to the master cylinder 14 is a reservoir tank 26 for storing a brake fluid. Connected to the reservoir tank 26 is one end of a hydraulic supply-exhaust pipe 28, and the other end of the hydraulic supply-exhaust pipe 28 is connected to a suction opening of the oil pump 34 which is driven by a motor 32. A discharge opening of the oil pump 34 is connected to a high-pressure pipe 30, and connected to this high-pressure pipe 30 are the accumulator 50 and a relief valve 53. In the present embodiment, the oil pump 34 to be used is a reciprocating pump equipped with two or more pistons (not shown) which are each reciprocated by the motor 32. The accumulator 50 to be used is one that stores the pressure energy of brake fluid converted into a pressure energy of a filler gas such as nitrogen. It is to be noted that the motor 32, the oil pump 34 and the accumulator 50 may be constructed together as a power supply unit separate from the hydraulic actuator 80 and installed outside the hydraulic actuator 80.

The accumulator 50 stores brake fluid whose pressure is raised to about 14 to 22 MPa, for instance, by the oil pump 34. A valve outlet of the relief valve 53 is connected to the hydraulic supply-exhaust pipe 28. If the pressure of the brake fluid in the accumulator 50 rises abnormally to about 25 MPa, for instance, the relief valve 53 will open to return the high-pressure brake fluid to the hydraulic supply-exhaust pipe 28. Further, an accumulator pressure sensor 51, which detects the exit pressure of the accumulator 50, namely, the pressure of brake fluid in the accumulator 50, is provided on the high-pressure pipe 30.

And the high-pressure pipe 30 is connected to the wheel cylinder 20FR for the right front wheel, the wheel cylinder 20FL for the left front wheel, the wheel cylinder 20RR for the right rear wheel, and the wheel cylinder 20RL for the left rear wheel via the pressure increasing valves 40FR, 40FL, 40RR and 40RL, respectively. Hereinbelow, the pressure increasing valves 40FR to 40RL will be generically referred to as "pressure increasing valve 40" or "pressure increasing valves 40" as appropriate. The pressure increasing valves 40 each provided with a linear solenoid and a spring is normally-closed type electromagnetic flow control valves (linear valves) which are each closed when power is not being applied to the solenoid. The pressure increasing valves 40 are each disposed so that the differential pressure between the accumulator pressure on the upstream side and the wheel cylinder pressure on the downstream side works as a force to open them. The opening degree of the pressure increasing valves 40 is adjusted in proportion to the electric current supplied to their respective solenoids. Through the pressure increasing valves 40, the upstream pressure, namely the accumulator pressure, is supplied, so that the pressure to the wheel cylinders 20 is increased.

The wheel cylinder 20FR for the right front wheel and the wheel cylinder 20FL for the left front wheel are connected to the hydraulic supply-exhaust pipe 28 via the front-wheel-side pressure reducing valves 42FR and 42FL, respectively. The pressure reducing valves 42FR and 42FL are normally-closed type electromagnetic flow control valves (linear valves) which are used to reduce the pressure of the wheel cylinders 20FR and 20FL as needed. The pressure reducing valves 42FR and 42FL, each provided with a linear solenoid and a spring, are each closed when power is not being applied to the solenoid, and the opening degree thereof is adjusted in proportion to the electric current supplied to their respective solenoids. The pressure reducing valves 42FR and 42FL are each disposed so that the differential pressure between the wheel cylinder pressure on the upstream side and the reservoir pressure (atmospheric pressure) on the downstream side works as a force to open them.

On the other hand, the wheel cylinder 20RR for the right rear wheel and the wheel cylinder 20RL for the left rear wheel are connected to the hydraulic supply-exhaust pipe 28 via the pressure reducing valves 42RR and 42RL, respectively, which are normally-open type electromagnetic flow control valves. The rear-wheel-side pressure reducing valves 42RR and 42RL, each provided with a linear solenoid and a spring, are each open when power is not being applied to the solenoid, and the opening degree thereof is adjusted in proportion to the electric current supplied to their respective solenoids. The rear-wheel-side pressure reducing valves 42RR and 42RL are each closed when the electric current has exceeded a predetermined current level which is set in relation to the wheel cylinder pressure. The pressure reducing valves 42RR and 42RL are each disposed so that the differential pressure between the wheel cylinder pressure on the upstream side and the reservoir pressure (atmospheric pressure) on the downstream side works as a force to open them. Hereinbelow, the pressure reducing valves 42FR to 42RL will be generically referred to as "pressure reducing valve 42" or "pressure reducing valves 42" as appropriate.

Wheel cylinder pressure sensors 44FR, 44FL, 44RR and 44RL, which detect the wheel cylinder pressure, or the pressure of brake fluid working on their corresponding wheel cylinders 20, are disposed in the vicinity of the wheel cylinders 20FR to 20RL for the right front wheel, the left front wheel, the right rear wheel and the left rear wheel, respectively. Hereinbelow, the wheel cylinder pressure sensors 44FR to 44RL will be generically referred to as "wheel cylinder pressure sensor 44" or "wheel cylinder pressure sensors 44" as appropriate.

The hydraulic actuator 80 is controlled by the ECU 100 that functions as a control unit in the present embodiment. The ECU 100 includes a CPU for performing various arithmetic processings, a ROM for storing various control programs, a RAM used as a work area for data storage and program execution, an I/O interface, memories, and so forth.

Connected to the ECU 100 are the stroke sensor 46, the master pressure sensors 48, and the wheel cylinder pressure sensors 44. The stroke sensor 46, the master pressure sensors 48, and the wheel cylinder pressure sensors 44 output signals indicating the measured values, and then the ECU 100 receives the output signal of each sensor as an input signal. The value detected by each sensor is fed to the ECU 100 at predetermined time intervals and then stored in a predetermined storage area of the ECU 100.

The brake control apparatus 10 configured as described above can carry out the regenerative-cooperative braking control, for instance. The brake control apparatus 10 starts a braking operation upon receipt of a request for braking. A request for braking is turned on when a braking force must be applied to the vehicle, such as when the driver has operated the brake pedal 12. When a "brake-on" condition is met, the ECU 100 determines that a driver's brake operation has been initiated and thus the request for braking is generated. When a "brake-off" condition is met, the ECU 100 determines that the driver's brake operation has been canceled and thus the request for braking is also canceled. For example, the ECU 100 may determine that the brake-off condition is met if the brake-on condition fails to be met.

Upon receipt of the braking request, the ECU 100 calculates a target deceleration, namely a required braking force, from the pedal stroke of the brake pedal 12 and the master cylinder pressure. The ECU 100 calculates a required fluid pressure braking force, which is a braking force to be generated by the brake control apparatus 10, by subtracting a regenerative braking force from the required braking force. Note here that the value of the regenerative braking force is supplied to the brake control apparatus 10 from a higher-level hybrid ECU (not shown). Then the ECU 100 calculates a target fluid pressure of the wheel cylinders 20FR to 20RL based on the calculated required fluid pressure braking force. The ECU 100 determines the values of control current to be supplied to the pressure increasing valves 40 and the pressure reducing valves 42 by feedback control such that the wheel cylinder pressure becomes the target fluid pressure. The ECU 100 carries out the calculation of target deceleration and target fluid pressure and the control of control valves repeatedly on a predetermined cycle during braking.

As a result, in the brake control apparatus 10, brake fluid is supplied to the respective wheel cylinders 20 from the accumulator 50 through the pressure increasing valves 40, and thus a desired braking force is applied to the wheels. Also, the brake fluid is discharged as needed from each of the wheel cylinders 20 through the pressure reducing valves 42, thereby adjusting the braking force to be applied to the wheels. In this manner, braking force control by a so-called brake-by-wire system is performed.

At this time, the right master cut valve 22FR and the left master cut valve 22FL are normally set in a closed state. During a regenerative-cooperative braking control, a differential pressure corresponding to the magnitude of regenerative braking force works between upstream and downstream of the master cut valves 22. The brake fluid sent out from the master cylinder 14 as the brake pedal 12 is pressed by the driver will flow into the stroke simulator 24. This will create a proper pedal reaction force.

In the present embodiment, when a brake system is normal, the ECU 100 determines that braking is on ("brake-on") when, for instance, the pedal stroke, which is a brake operation input by the driver, exceeds a "braking on" determination threshold. For example, the ECU 100 determines a "braking on" on condition that all the pedal strokes calculated based on the detection values of the respective output systems of the stroke sensor 46 exceed the "braking on" determination threshold. Also, the ECU 100 may determine a "braking on" or not by using, for instance, the respective measured values of the right master pressure sensor 48FR and the left master pressure sensor 48FL as a brake operation input by the driver. The ECU 100 may determine a "braking on" on condition that both of the respective measured values of the right master pressure sensor 48FR and the left master pressure sensor 48FL exceed a predetermined liquid pressure threshold.

Also, when the brake system is normal, a target deceleration may be calculated for instance as follows. First the ECU 100 reads in a pedal stroke ST measured by the stroke sensor 46 and a master cylinder pressure PMC measured by the master pressure sensor 48. Note that the measured value to be employed may be one of the two measured values of the master pressure sensor 48 or the average value of the two measured values. Also, the ECU 100 may have these input signals pass through a low-pass filter as appropriate to make them smoother signals.

The ECU 100 derives a target deceleration $G_{ST}$ of stroke from the measured values of the pedal stroke ST. For example, a mapped relationship between the pedal stroke ST and the target deceleration $G_{ST}$ of stroke based on the stroke ST is stored in advance in ECU 100. In one example, the relationship is set such that the rate of increase in the target deceleration $G_{ST}$ of stroke rises with the increase in pedal stroke ST.

Further, the ECU 100 derives a target deceleration $G_{PMC}$ of master cylinder pressure from the measured values of the master cylinder pressure PMC. Also, a mapped relationship between the master cylinder pressure PMC and the target deceleration $G_{PMC}$ of master cylinder pressure based on the master cylinder pressure PMC is stored in advance in the ECU 100. For example, the relationship is set such that the master cylinder pressure PMC and the target deceleration $G_{PMC}$ of master cylinder pressure are in an almost linear relation to each other.

The ECU 100 calculates a total target deceleration $G_O$ as a weighted average value of the above-mentioned target deceleration $G_{ST}$ of stroke and target deceleration $G_{PMC}$ of master cylinder pressure, using Equation (1) below.

$$G_O = \alpha \cdot G_{PMC} + (1-\alpha) G_{ST} \quad \text{Equation (1)}$$

In the Equation (1), the coefficient $\alpha$, which is a weight for the target deceleration $G_{PMC}$ of master cylinder pressure, is any value between 0 and 1 inclusive. The ECU 100 calculates the coefficient $\alpha$ based on the target deceleration $G_{PMC}$ of master cylinder pressure, for instance. The ECU 100 has a preset relationship between the value of the target deceleration $G_{PMC}$ of master cylinder pressure based on the master cylinder pressures and the coefficient $\alpha$ stored therein.

The ECU 100 further calculates the target fluid pressure for each wheel cylinder 20 based on the calculated total target deceleration $G_O$ and controls the pressure increasing valves 40 and the pressure reducing valves 42 so that the wheel cylinder pressure becomes the target fluid pressure.

Note that even when the required braking force is covered only by the fluid pressure braking force without utilizing the regenerative braking force, the brake control unit 10 according to the present embodiment can control the braking force as a matter of course. Whether a regenerative-cooperative braking control is operated or not, the control mode in which the braking force is controlled by the pressure increasing valves 40 and the pressure reducing valves 42 will hereafter be referred to as "linear control mode" as appropriate. Or there may be cases where it is referred to as a control of brake by wire. When the brake system is normal, the linear control mode is usually selected for the control of the braking force.

During the control in the linear control mode, there may be cases of the wheel cylinder pressure deviating from the target fluid pressure due to a response lag or overshoot of an operating fluid pressure, for instance. The ECU 100 periodically checks for the presence of any response abnormality of wheel cylinder pressure, for instance, based on the measured value of the wheel cylinder pressure sensor 44. The ECU 100, for example, determines the abnormality of the control response of wheel cylinder pressure when the state of the measured wheel cylinder pressure value deviating from the target fluid pressure by more than an allowable limit lasts longer than a predetermined length of time. When it is determined that the control response of wheel cylinder pressure is abnormal, the ECU 100 discontinues the linear control mode and switches the control mode to a backup brake mode. Or there may be cases where the brake system develops a failure in some position (e.g., sensor failure). In such a case, too, the ECU 100 may discontinue the linear control mode and switch the control mode to the backup brake mode (hereinafter referred to as "backup control mode" as appropriate).

In the backup control mode, an input to the brake pedal 12 by the driver is translated into a fluid pressure, which is then mechanically communicated to the wheel cylinder 20, thereby applying a braking force to the wheels. The ECU 100 discontinue the control of the pressure increasing valves 40 and the pressure reducing valves 42. As a result, the pressure increasing valves 40 and the pressure reducing valves 42 assume their initial positions. That is, all of the pressure increasing valves 40 are closed, and, of the pressure reducing valves 42, the front pressure reducing valves 42FR, 42FL are closed and the rear pressure reducing valves 42RR, 42RL are opened. Also, the master cut valves 22 are opened. In the present embodiment, a pressure increasing valve 40 and a pressure reducing valve 42 are provided for each of the wheels. Therefore, the arrangement may also be such that the ECU 100 determines any response abnormality of wheel cylinder pressure for each wheel and switches the control mode to the backup control mode for the specific wheel cylinder of which abnormality has been detected.

Figure 2:
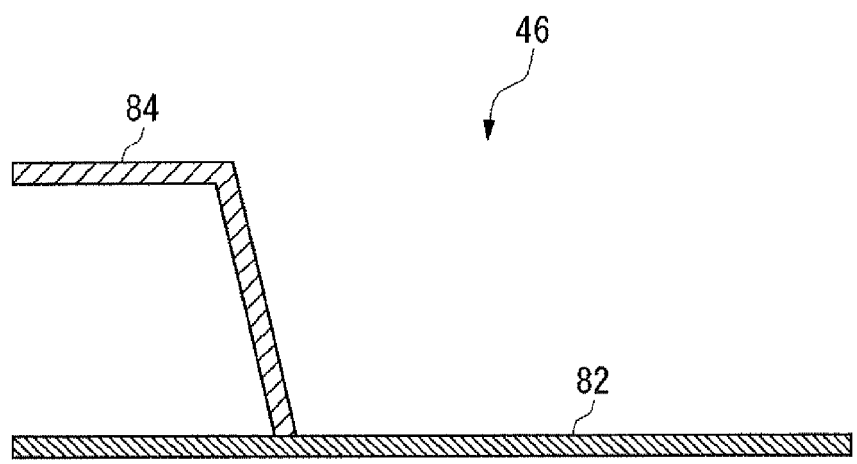
FIG. 2 is an illustration showing a structure of a part of a stroke sensor according to a first embodiment.

FIG. 2 is an illustration showing a structure of a part of a stroke sensor 46 according to the first embodiment. The stroke sensor 46, which is a sliding-type stroke sensor, includes a resistor 82 and a brush 84. The brush 84 is fixed to the brake pedal 12 and slides on the resistor 82 by the distance equal to the stroke of the brake pedal 12.

Figure 3:
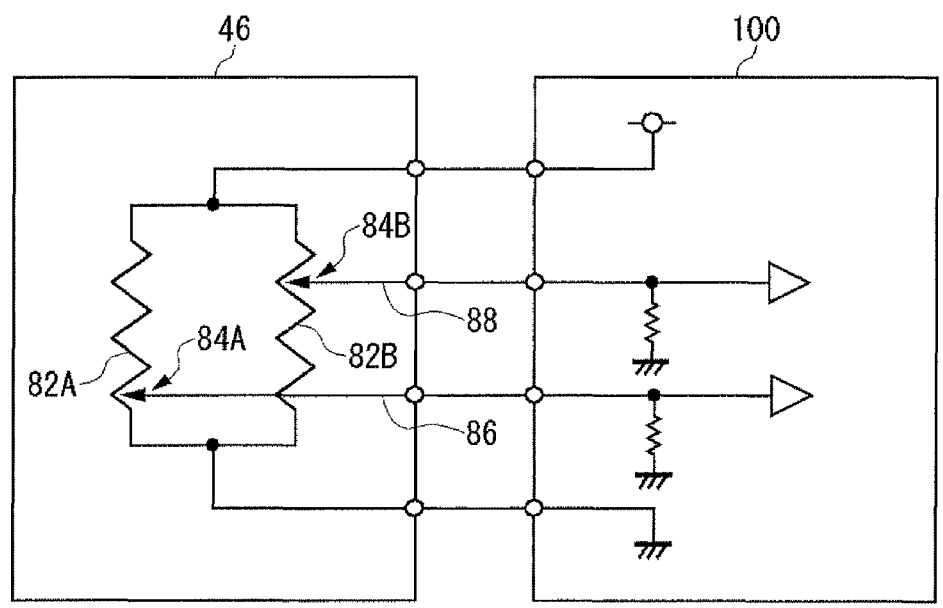
FIG. 3 is a circuit diagram of a stroke sensor according to a first embodiment.

FIG. 3 is a circuit diagram of a stroke sensor 46 according to the first embodiment. The stroke sensor 46 has two pairs of a resistor 82 and a brush 84. In the following description, these will be referred to as a first resistor 82A, a second resistor 82B and a first brush 84A, a second brush 84B.

The first resistor 82A and the second resistor 82B are connected in parallel with each other, and a predetermined voltage is applied across each of them. The first brush 84A slides on the first resistor 82A along with the rotation of the brake pedal 12, whereas the second brush 84B slides on the second resistor 82B along with the rotation of the brake pedal 12. The first brush 84A and the second brush 84B are coupled to the ECU 100, and each of them is grounded via resistance. Thus, a voltage in proportion to the stroke of the brake pedal 12 is induced between the contact point of the first brush 84A and the first resistor 82A and a grounding point inside the ECU 100. Here, let us refer to this voltage as a first voltage V1 and the construction inducing the first voltage V1 as a first voltage detecting area 86 (first voltage detector 86). Also, a voltage in proportion to the stroke of the brake pedal 12 is also induced between the contact point of the second brush 84B and the second resistor 82B and a grounding point inside the ECU 100. Let us also refer to this voltage as a second voltage V2 and the construction inducing the second voltage V2 as a second voltage detecting area 88 (second voltage detector 88).

Figure 4:
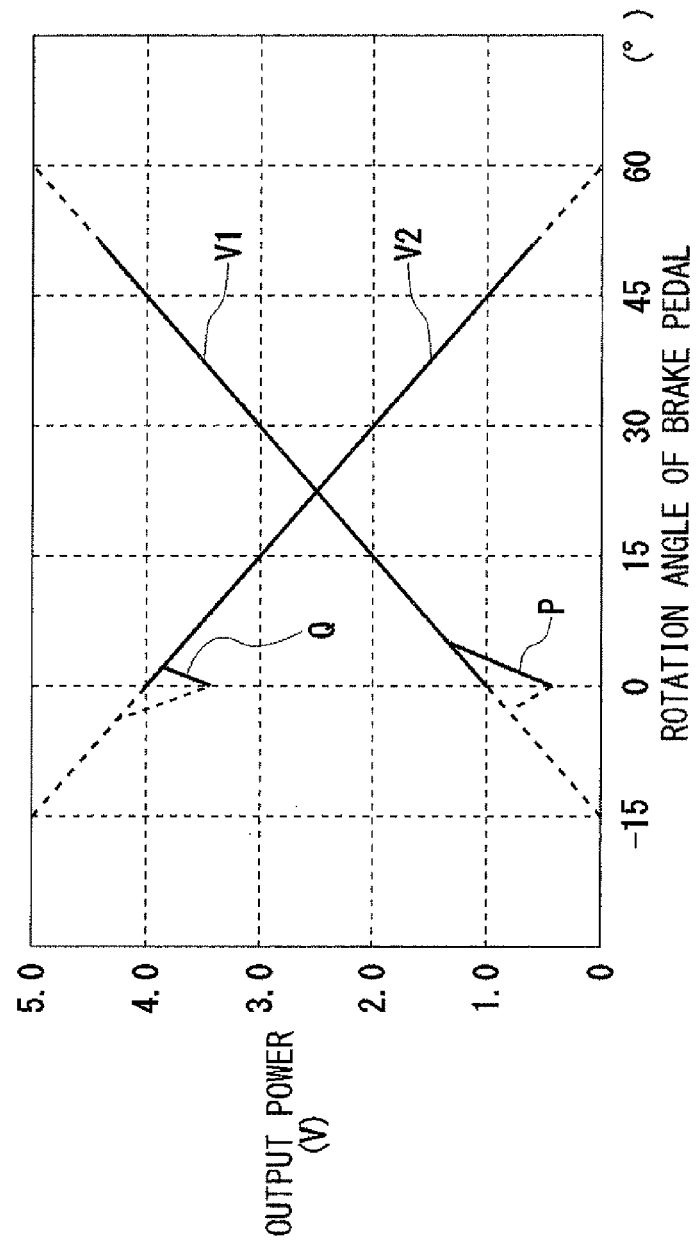
FIG. 4 is a graph showing relationships of the rotation angle of a brake pedal with a first voltage V1 and a second voltage V2.

FIG. 4 is a graph showing the relationships of the rotation angle of the brake pedal 12 with the first voltage V1 and the second voltage V2. As shown in FIG. 4, the first voltage V1 increases linearly with the increase in the rotation angle, or the stroke, of the brake pedal 12. On the other hand, the second voltage V2 decreases linearly with the increase in the stroke of the brake pedal 12. In the first embodiment, therefore, a relationship of "first voltage V1+second voltage V2=5 (V)" holds.

The ECU 100 monitors both of the first voltage V1 and the second voltage V2 induced at the first voltage detector 86 and the second voltage detector 88, respectively, and acquires the stroke of the brake pedal 12, using both of the voltage values. When there occurs any abnormality of either the first voltage detector 86 or the second voltage detector 88, the ECU 100 acquires the stroke of the brake pedal 12 by selecting the normal one of the voltage values. In this manner, two units of electrical characteristic, which change with the stroke of the brake pedal 12, are obtained. Hence, even when a trouble occurs with one of them, the stroke of the brake pedal 12 is detected.

However, since the first brush 84A slides on the first resistor 82A, abrasion powder is produced from both of them as the act of stepping on the brake pedal 12 is repeated. The same is also true for the second brush 848 and the second resistor 828. The adhesion of abrasion powder between the first brush 84A and the first resistor 82A or between the second brush 84B and the second resistor 82B will cause changes in the relationship between the stroke and the first voltage V1 or between the stroke and the second voltage V2.

The brake pedal 12 is rotatable between a stroke starting end, which is the position of 0-degree stroke and a stroke completing end, which is the position of the brake pedal 12 stepped on fully to a maximum stroke. Therefore, the repeated act of stepping on the brake pedal 12 is more likely to cause an accumulation of abrasion powder at the end positions of the first brush 84A and the second brush 84B when the brake pedal 12 is at the stroke starting end and at the end positions of the first brush 84A and the second brush 84B when the brake pedal 12 is at the stroke completing end.

For example, if abrasion powder accumulates at the end position of the first brush 84A when the brake pedal 12 is at the stroke starting end, then the first voltage V1 will drop in the vicinity of 0-degree rotation angle of the brake pedal 12 as indicated by P in FIG. 4. Also, if abrasion powder accumulates at the end position of the second brush 84B when the brake pedal 12 is at the stroke starting end, then the second voltage V2 will drop in the vicinity of 0-degree rotation angle of the brake pedal 12 as indicated by Q in FIG. 4.

While an ignition switch (not shown) is on, the ECU 100 monitors the first voltage V1 and the second voltage V2 constantly and determines from the balance between them whether an abnormality of the stroke sensor 46 has occurred or not. More specifically, the ECU 100 determines that at least one of the first voltage V1 and the second voltage V2 is abnormal, for example, when the sum of the first voltage V1 and the second voltage V2 drops below a predetermined voltage value. When the ECU 100 determines that it cannot acquire the stroke accurately from the values detected by the stroke sensor 46 due to the presence of abnormality of the first voltage V1 and the second voltage V2, the ECU 100 cancels a normal-time braking control. And the ECU 100 turns on the backup control mode (abnormal-time braking control) in which the master cut valve 22 is opened and the master cylinder pressure is directly conveyed to the wheel cylinder 20FR for right front wheel and the wheel cylinder 20FL for left front wheel. On the other hand, when the first voltage V1 and the second voltage V2 are abnormal due to an accumulation of abrasion powder at the brush position corresponding to the stroke starting end, the first voltage V1 and the second voltage V2 may return to normal values with an increase in actual stroke. In such a case, namely, as the first voltage V1 and the second voltage V2 return to normal values, the ECU 100 will restart the linear control mode (normal-time braking control) that has been canceled.

While the normal-time braking control is being operated, the pedaling force applied by the driver on the brake pedal 12 is controlled by the stroke simulator 24. However, while the abnormal-time braking control is operated, the pedaling force applied by the driver on the brake pedal 12 is directly communicated to the wheel cylinder 20FR for right front wheel and the wheel cylinder 20FL for left front wheel via the master cylinder 14. Therefore, if a switching takes place between the normal-time braking control and the abnormal-time braking control in the process of changing the stroke of the brake pedal 12, the driver may experience a strange brake feeling due to a change in the pedaling force on the brake pedal 12.

A solution to this problem, a control performed as follows may be conceivable. That is, if, in the procedure of determining abnormality of the stroke sensor 46, the brake pedal 12 is determined to be located near the stroke end, the determination of abnormality of the stroke sensor 46 is not made despite the values of the first voltage V1 and the second voltage V2. In this case, the normal-time braking control is continued without regard to the output voltages of the stroke sensor.

Also, the presence of abrasion powder may possibly cause deviations of measured values of the stroke sensor from the normal range or fluctuations of the measured values. For example, a slight movement of the stepped-on brake pedal or even a constant pedaling (pressing level) of the brake pedal may cause the output voltage of the stroke sensor to fluctuate conspicuously. In such cases, the target deceleration $G_{ST}$ of stroke based on the stroke derived from the measured value of pedal stroke ST may also fluctuate conspicuously, and as a result, the total target deceleration $G_0$ calculated from the Equation (1) may also fluctuate conspicuously.

When the variation of the first voltage V1 or the second voltage V2 in the stroke sensor 46 does not fall in the range that warrants the determination of abnormality of the stroke sensor 46, the normal-time braking control is continued. In other words, the ECU 100 calculates the target fluid pressure for each of the wheel cylinders 20 based on the calculated total target deceleration $G_0$, and controls the pressure increasing valve 40 and the pressure reducing valve 42 so as to adjust the wheel cylinder pressure to the target fluid pressure. As a result, even when the driver maintains a nearly constant pedaling of the brake pedal, the braking force (deceleration) may fluctuate due to the control in response to the fluctuating total target deceleration $G_0$, and consequently the driver may experience a strange brake feeling.

Therefore, even when no abnormality of the stroke sensor is determined, there are possibilities of the braking force changing on account of the fluctuation of the target deceleration $G_{ST}$ of stroke based on the stroke. To solve this problem, the inventors have focused attention on the coefficient $(1-\alpha)$, which is the weight of the target deceleration $G_{ST}$ of stroke based on the stroke, in the Equation (1) for calculating the total target deceleration $G_0$. That is, they focused their attention on the fact that the smaller the coefficient $(1-\alpha)$ is, the less will be the effect of the fluctuation of the target deceleration $G_{ST}$ of stroke calculated from the stroke sensor output on the total target deceleration $G_0$. Thus, the inventors have come up with a stroke sensor abnormality determining apparatus taking the above-mentioned points into consideration.

Hereinbelow, the structure of a stroke sensor abnormality determining apparatus to be used in the determination of abnormality of the stroke sensor 46 and the procedure of the abnormality determination on the stroke sensor 46 will be discussed in detail by referring to FIG. 5 and FIG. 6.

Figure 5:
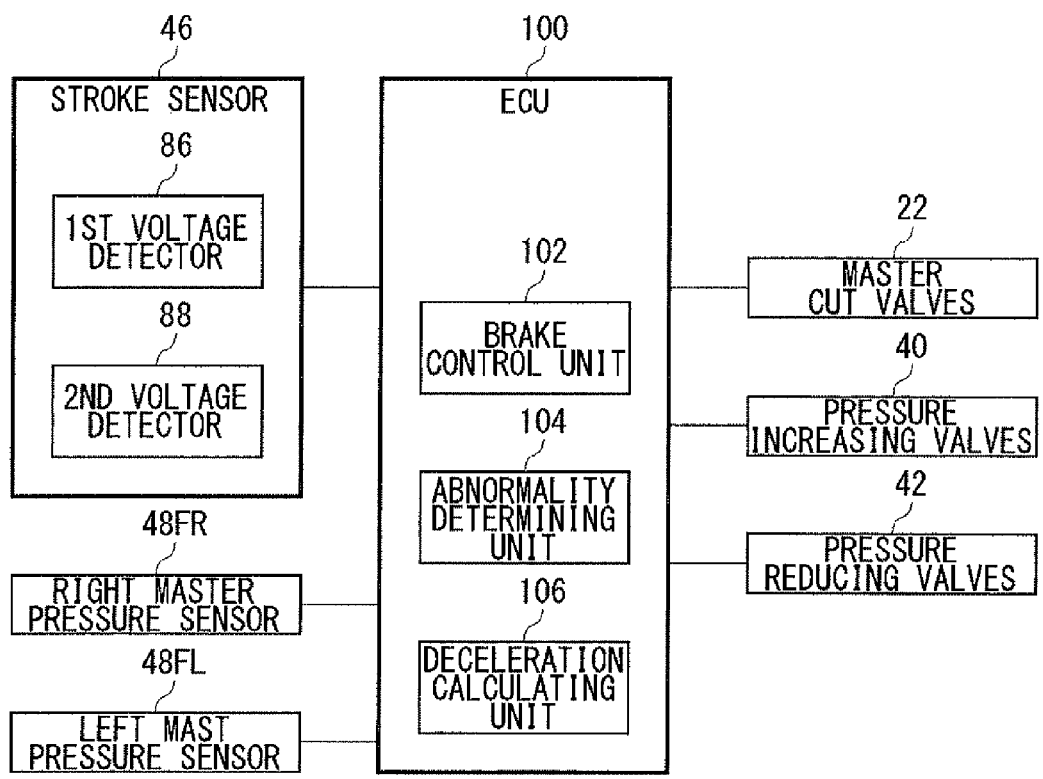
FIG. 5 is a block diagram showing a structure of a stroke sensor abnormality determining apparatus according to a first embodiment.

FIG. 5 is a block diagram illustrating a structure of a stroke sensor abnormality determining apparatus 200 according to the first embodiment. FIG. 5 depicts functional blocks of the ECU 100 that can be realized by hardware, such as a CPU for executing various arithmetic processings, a ROM for storing various control programs, and a RAM for data storage and used as work area for executing programs, in cooperation with software. Therefore, these functional blocks may be implemented by a variety of manners including hardware only, software only or a combination of both.

The stroke sensor abnormality determining apparatus 200 includes a stroke sensor 46, a right master pressure sensor 48FR, a left master pressure sensor 48FL, and an ECU 100. The ECU 100 includes a brake control unit 102, an abnormality determining unit 104, and a deceleration calculating unit 106. The brake control unit 102 controls the openings and closings of the master cut valves 22, the pressure increasing valves 40 and the pressure reducing valves 42, respectively. The abnormality determining unit 104 determines if abnormality occurs in the stroke sensor 46, by using the detection result based on the electric signals from the first voltage detector 86 and the second voltage detector 88. And the abnormality determining unit 104 is configured so that a signal indicating the abnormality of the stroke sensor 46 can be outputted if the abnormality is determined to have occurred in the stroke sensor 46. Using the detection result based on the stroke of a pedal and the master cylinder pressure, the deceleration calculating unit 106 calculates a total target value, namely the total target deceleration $G_0$ in the present embodiment, which is correlated with a target deceleration of a vehicle.

In calculating the braking force (i.e., deceleration) required to stop a vehicle, the "target value" is defined as a value correlated with the braking force. More specifically, other than the target deceleration used in the present embodiment, the "target values" as used herein may be indicators such as the target braking force, the target braking torque, and the target hydraulic pressure which are related with the deceleration. Also, the "total target value" such as the total target deceleration $G_0$ according to the present embodiment may be a value, correlated with the braking force, which is finally calculated based on one or more target values (e.g., the target deceleration $G_{ST}$ of stroke and the target deceleration $G_{PMC}$ of master cylinder pressure).

Figure 6:
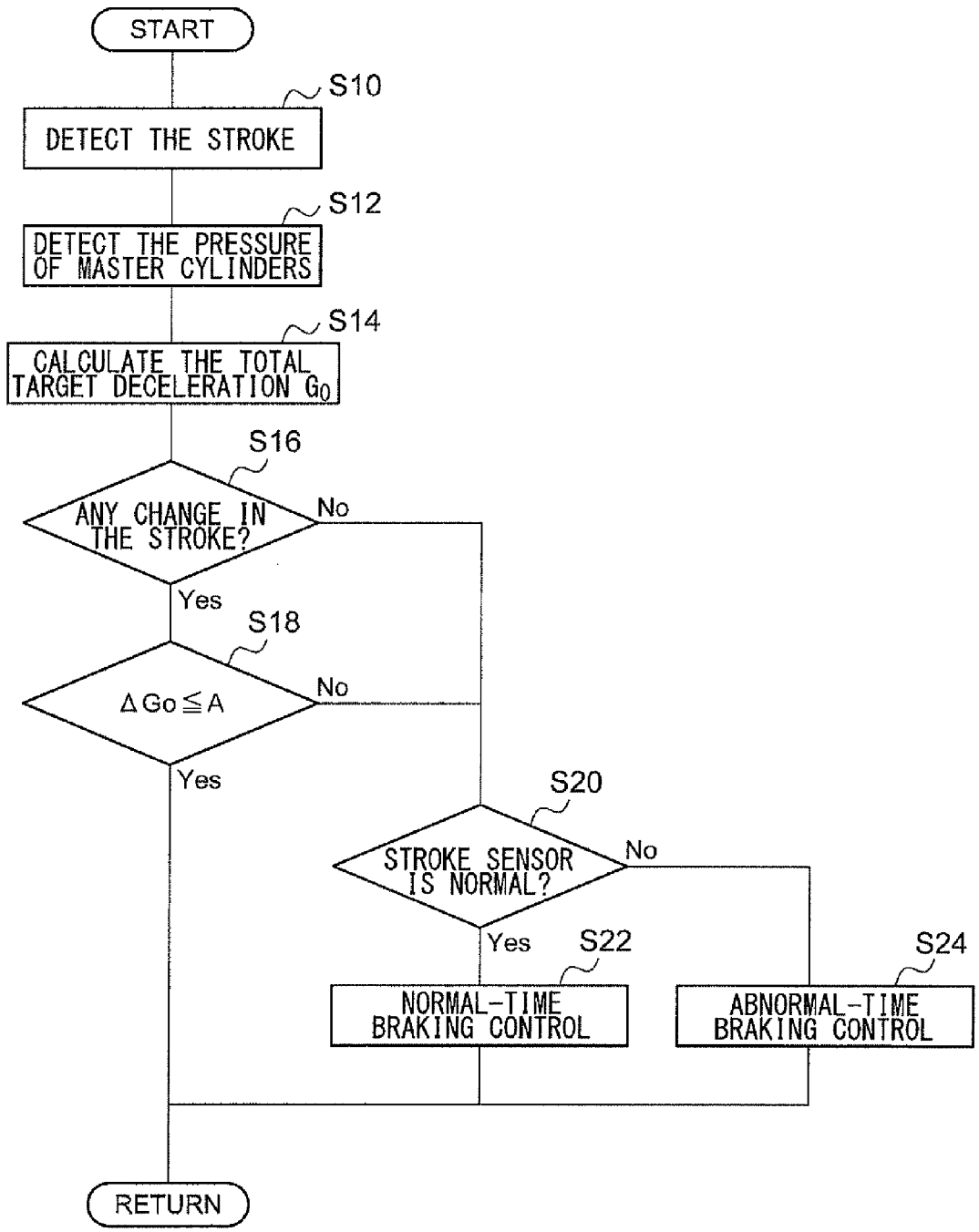
FIG. 6 is a flowchart showing a procedure of the abnormality determination on a stroke sensor carried out by a stroke sensor abnormality determining apparatus according to a first embodiment.

FIG. 6 is a flowchart showing a procedure of the abnormality determination on the stroke sensor 46 carried out by the stroke sensor abnormality determining apparatus 200 according to the first embodiment. The processing in the flowchart of FIG. 6 starts when the ignition switch is on, and then will be repeatedly carried out at every predetermined time interval until the ignition switch is off.

The deceleration calculating unit 106 first detects the pedal stroke ST from the stroke sensor 46 (S10) and, at the same time, detects the master cylinder pressures PMC from the right master pressure sensor 48FR and the left master pressure sensor 48FL (S12). The deceleration calculating unit 106 calculates the total target deceleration $G_O$, based on the Equation (1), from the aforementioned mapped relationship between the pedal stroke ST and the target deceleration $G_{ST}$ of stroke based on the stroke ST; similarly, the deceleration calculating unit 106 calculates it, based on the Equation (1), from the aforementioned mapped relationship between the master cylinder pressure PMC and the target deceleration $G_{PMC}$ of master cylinder pressure based on the master cylinder pressure PMC, and so forth (S14).

In the sliding type stroke sensor 46, since the brushes slide on the resistors, there are cases where abrasion powder of the brushes and abrasion power of the resistors are accumulated between the brushes and the resistors. The abrasion power may adversely affect the relationship between the stroke of the brake pedal 12 and the electric signals to be detected (e.g., voltage values) and therefore may possibly inhibit the abnormality of the stroke sensor 46 from being properly determined. On the other hand, in the course of calculating the total target deceleration $G_0$, even if the stroke varies, the total target deceleration $G_0$ may barely change according to the relationship between the stroke and the total target deceleration $G_0$ as shown in the Equation (1). In this case, the stroke and the total target deceleration $G_0$ is hardly affected by the change in the stroke even if the stroke and the total target deceleration $G_0$ is calculated based on the detected stroke. In other words, there will be less or no need for changing the on-going braking control mode because the stroke sensor is determined to be abnormal.

Accordingly, if the fluctuation of the target deceleration $G_{ST}$ of stroke calculated based on the output of the stroke sensor gives little impact on the total target deceleration $G_0$, the need for braking control performed on the assumption that an abnormality of the stroke sensor occurs will lessen. In other words, if the variation in the total target deceleration $G_0$ is small even though the detected variation in the stroke is greater than or equal to a preset threshold value or if the variation in the total target deceleration $G_0$ relative to the detected variation in the stroke is less than or equal to a preset threshold value, the need for braking control performed on the assumption that an abnormality of the stroke sensor occurs will be low.

In the light of this, whether or not there is any change in the stroke ST is determined after the total target deceleration $G_0$ has been calculated (S16). The abnormality determining unit 104 compares the previous stroke ST against the current stroke ST and if the difference therebetween is larger than a predetermined threshold value, the abnormality determining unit 104 will determine that there has been a change in the stroke ST (Yes of S16). If, on the other hand, the difference between the previous stroke ST and the present stroke ST is less than the predetermined threshold value, the abnormality determining unit 104 will determine that there is no change in the stroke ST (No of S16).

If it is determined that there is a change in the stroke ST, the abnormality determining unit 104 will determine whether the difference $\Delta G_0$ between a total target deceleration $G_0'$ calculated previously and the total target deceleration $G_0$ calculated this time is less than or equal to a predetermined threshold value A or not (S18). If the variation $\Delta G_0$ in the total target deceleration $G_0$ is less than or equal to the predetermined threshold value A (Yes of S18), the abnormality determining unit 104 will stop the processes in the flowchart of FIG. 6, for the time being, without the trouble of determining whether or not an abnormality of the stroke sensor has occurred and outputting the signal indicating the abnormality of the stroke sensor. In so doing, the brake control unit 102 stops the processes in this flowchart of FIG. 6, for the time being, without switching to the normal-time braking control and the abnormal-time braking control.

As described above, if there is some change in the stroke but if the difference $\Delta G_0$ in the total target deceleration $G_0$ is less than or equal to the predetermined threshold value A, the abnormality determining unit 104 will not output the signal indicating the abnormality of the stroke sensor. This suppresses the unnecessary change of the braking control and reduces the strange brake feeling due to a change in the braking control, thereby contributing to further improvement of brake feeling. Note here that the "unnecessary change of the braking control" includes a case where the need to change the braking control is small.

Note that the predetermined threshold value A is set to an appropriate value through experiments or simulation runs. For example, the threshold value may be set according as whether or not the change $\Delta G_0$ in the total target deceleration $G_0$ due to a change in the stroke affects the brake feeling. From such a viewpoint, the predetermined threshold value A is preferably set to "0", for instance. Even if, in such a case, fluctuations are caused in the detected stroke due to an abnormality of the stroke sensor, the change $\Delta G_0$ in the total target deceleration $G_0$ will be "0" in the first place. Thus, even though the brake control apparatus 10 continues to perform the braking control under the on-going control mode based on the total target deceleration $G_0$ without determining whether or not an abnormality of the stroke sensor 46, the driver will not experience a strange brake feeling due to the abnormality of the stroke sensor 46.

If it is determined that there is no change in the stroke ST (No of S16) and if the difference $\Delta G_0$ in the total target deceleration $G_0$ is less than or equal to the predetermined threshold value A (No of S18), the abnormality determining unit 104 will determined if there occurs an abnormality of the stroke sensor 46, by using the first voltage V1 and the second voltage V2 detected (S20). If it is determined that the stroke sensor 46 is normal (Yes of S20), the brake control unit 102 will carry out the normal-time braking control (S22). If it is determined that there has occurred an abnormality of the stroke sensor 46 (No of S20), the brake control unit 102 will carry out the abnormal-time braking control (S24).

In the normal-time braking control, the brake control unit 102 first calculates the total target deceleration $G_0$ based on the stroke of the brake pedal 12 detected by the stroke sensor 46 and the master cylinder pressures detected by the master pressure sensors 48, while the master cut valves 22 are being closed. Then the brake control unit 102 calculates target wheel cylinder pressures of the respective wheel cylinders 20. The brake control unit 102 controls the openings and closings of the pressure increasing valves 40 and the pressure reducing valves 42, respectively, so that the wheel cylinder pressures of the respective wheel cylinder 20 becomes the target wheel cylinder pressures. Since the normal-time braking control is a known technology, a further detailed description of the normal-time braking control will be omitted.

In the abnormal-time braking control, the brake control unit 102 interrupts the control of the respective wheel cylinders 20 performed through the pressure increasing valves 40 and the pressure reducing valves 42, and opens the master cut valves 22 so as to have the master cylinder pressure of the master cylinder 14 directly conveyed to the wheel cylinder 20FR for right front wheel and the wheel cylinder 20FL for left front wheel, respectively. Since the abnormal-time braking control is a known technology, a detailed description of the abnormal-time braking control will be omitted. Such a abnormal-time braking control as described above is performed when it is determined that abnormality has occurred in the stroke sensor 46, so that controlling the wheel cylinder pressures based on the detection result from the stroke sensor 46 where the abnormality has occurred can be prevented from being activated.

In the procedure of determining abnormality of the stroke sensor 46 shown in the flowchart of FIG. 6, the determination as to whether or not there occurs an abnormality of the stroke sensor is not made under certain conditions (when the determination results of Step S16 and Step S18 are Yes). And the flowchart of FIG. 6 shows an example where a signal indicating the abnormality of the stroke sensor cannot be outputted in the first place. However, the case where "signal indicating the abnormality of the stroke sensor is not outputted" may be, for example, a case where the determination as to whether or not there occurs an abnormality of the stroke sensor is temporarily made but the signal indicating its result is not outputted. More specifically, the abnormality determining unit 104 may be configured as follows. That is, the determination as to whether or not there occurs an abnormality of the stroke sensor 46 is temporarily made after Step S10 in the flowchart of FIG. 6. And if the condition $\Delta G_0 \leq A$ is met, the signal indicating the abnormality of the stroke sensor will not be outputted even though after Step S10 it is temporarily determined that an abnormality of the stroke sensor 46 has occurred.

(Second Embodiment)

In the procedure of the abnormality determination on the stroke sensor 46 carried out by the stroke sensor abnormality determining apparatus 200 according to the first embodiment, the attention is focused on the variation in the total target deceleration $G_0$. In contrast thereto, in a second embodiment, the attention is focused on the rate $(1-\alpha)$ that contributes to the target deceleration $G_{ST}$ of stroke, which is a function correlated with the stroke, in the calculation of the total target deceleration $G_0$. If the value measured at the stroke sensor is abnormal but the effect of the target deceleration $G_{ST}$ of stroke calculated from the value of the stroke sensor on the calculation of the total target deceleration $G_0$ is small, namely, if the rate $(1-\alpha)$ is small, there will be less or no need for determining that an abnormality of the stroke sensor has occurred and thereby carrying out the abnormal-time braking control.

Figure 7:
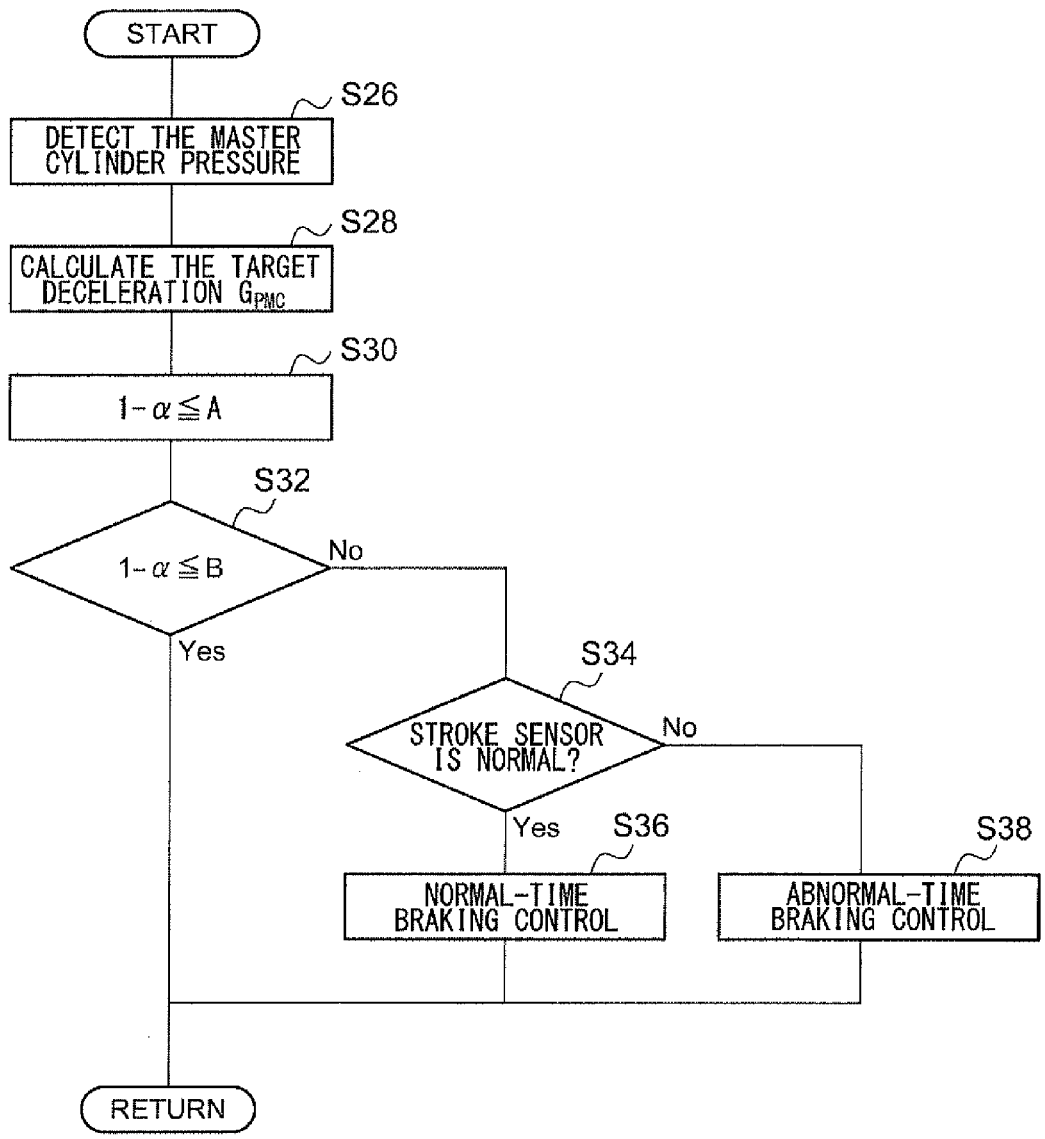
FIG. 7 is a flowchart showing a procedure of the abnormality determination on a stroke sensor carried out by a stroke sensor abnormality determining apparatus according to a second embodiment.

FIG. 7 is a flowchart showing a procedure of the abnormality determination on the stroke sensor 46 carried out by a stroke sensor abnormality determining apparatus 200 according to the second embodiment. Note that, in the following description, the description of steps similar to those explained already in the first embodiment is omitted as appropriate.

The deceleration calculating unit 106 detects the master cylinder pressure PMC from the right master pressure sensor 48FR and the left master pressure sensor 48FL (S26). Then the deceleration calculating unit 106 calculates the target deceleration $G_{PMC}$ of master cylinder pressure from the mapped relationship between the master cylinder pressure PMC and the target deceleration $G_{PMC}$ of master cylinder pressure based on the master cylinder pressure PMC (S28). And, at the same time, the deceleration calculating unit 106 calculates similarly the coefficient $\alpha$ from the mapped relationship between the target deceleration $G_{PMC}$ of master cylinder pressure and the coefficient $\alpha$ (S30).

Suppose that the degree to which the target deceleration $G_{ST}$ of stroke contributes to the calculation of the total target deceleration $G_0$ shown in Equation (1) is small. Then the total target deceleration $G_0$ may hardly vary even though the target deceleration $G_{ST}$ of stroke varies. In such a case, the calculation of the total target deceleration $G_0$ the based on calculated target deceleration $G_{ST}$ of stroke shows that a change in the target deceleration $G_{ST}$ of stroke has almost no effect on the variation in the total target deceleration $G_0$. In other words, there will be less or no need for changing the on-going braking control mode because the stroke sensor is determined to be abnormal.

That is, if the fluctuation of the target deceleration $G_{ST}$ of stroke calculated based on the output of the stroke sensor gives little impact on the total target deceleration $G_0$, namely, if the degree to which the target deceleration $G_{ST}$ of stroke contributes to the calculation of the total target deceleration $G_0$ is a small, the need for braking control performed on the assumption that an abnormality of the stroke sensor occurs will lessen.

In the light of this, the abnormality determining unit 104 first calculates the coefficient α and then determines if the coefficient (1−α) indicating the degree to which the target deceleration $G_{ST}$ of stroke contributes thereto is less than or equal to a predetermined rate B (S32). If the coefficient (1−α) is less than or equal to the predetermined rate B (Yes of S32), the abnormality determining unit 104 will stop the processes in the flowchart of FIG. 7, for the time being, without the trouble of determining whether or not an abnormality of the stroke sensor has occurred and outputting the signal indicating the abnormality of the stroke sensor. In so doing, the brake control unit 102 stops the processes in this flowchart of FIG. 7, for the time being, without switching to the normal-time braking control and the abnormal-time braking control.

As described above, if the coefficient (1−α) indicating the contribution of the target deceleration $G_{ST}$ of stroke contributes thereto is less than or equal to the predetermined rate B, the abnormality determining unit 104 will not output the signal indicating the abnormality of the stroke sensor. This suppresses the unnecessary change in the braking control and reduces the strange brake feeling due to a change in the braking control, thereby contributing to further improvement of brake feeling.

Note that the predetermined rate B is set to a suitable value through experiments or simulation runs. For example, in consideration of an effect of the contribution of the target deceleration $G_{ST}$ of stroke on the total target deceleration $G_0$, the predetermined rate may be set according as whether or not the change in the total target deceleration $G_0$ affects the brake feeling. From such a viewpoint, the predetermined rate B is preferably set to 0.1 or below, for instance. More preferably, it is set to "0". Even if, in such a case, fluctuations are caused in the detected stroke due to an abnormality of the stroke sensor, the target deceleration $G_{ST}$ of stroke will not at all contributed to the calculation of the total target deceleration $G_0$. Thus, even though the brake control apparatus 10 continues to perform the braking control under the on-going control mode based on the total target deceleration $G_0$ without determining whether or not an abnormality of the stroke sensor 46, the driver will not experience a strange brake feeling due to the abnormality of the stroke sensor 46.

If it is determined that the coefficient (1−α) is larger than the predetermined rate B (No of S32), the abnormality determining unit 104 will determine if an abnormality of the stroke sensor 46 occurs, similarly to Step 20 of the first embodiment (S34). If the stroke sensor 46 is determined to be normal (Yes of S34), the brake control unit 102 will carry out the normal-time braking control (S36). And if it is determined that an abnormality of the stroke sensor 46 has occurred (No of S34), the brake control unit 102 will carry out the abnormal-time braking control (S38).

As shown in the aforementioned Equation (1), the deceleration calculating unit 106 according to the present embodiment calculates the total target deceleration $G_0$ as follows. That is, the total target deceleration $G_0$ is calculated such that the target deceleration $G_{ST}$ of stroke and the target deceleration $G_{PMC}$ of master cylinder pressure are added together at the predetermined rates of (1−α) and a applied thereto, respectively, according to a condition, by using the target deceleration $G_{ST}$ of stroke, which is calculated based on the electric signal detected by the stroke sensor 46, and the target deceleration $G_{PMC}$ of master cylinder pressure, which is calculated based on the electric signals detected by the master pressure sensors 48. This suppresses the unnecessary change of the braking control in the face of the occurrence of an abnormality of the stroke sensor 46. Also, since the total target deceleration $G_0$ is calculated mainly based on the electric signals detected by the master pressure sensors 48, the ordinary braking control can be maintained with accuracy.

In the procedure of the abnormality determination on the stroke sensor 46 shown in the flowchart of FIG. 7, no determination as to whether or not an abnormality of the stroke sensor occurs is made under a certain condition (when the determination result of Step S32 Yes). Note that FIG. 7 is an example where a signal indicating the abnormality of the stroke sensor cannot be outputted in the first place. However, the case where "signal indicating the abnormality of the stroke sensor is not outputted" may be, for example, a case where the determination as to whether or not an abnormality of the stroke sensor occurs is temporarily made but the signal indicating its result is not outputted. More specifically, the abnormality determining unit 104 may be configured as follows. That is, the determination as to whether or not an abnormality of the stroke sensor occurs is temporarily made before or after Step S26 in the flowchart of FIG. 7. And if the condition 1−α≤B is met, the abnormality determining unit 104 will not output the signal indicating the abnormality of the stroke sensor even though it is temporarily determined that an abnormality of the stroke sensor 46 has occurred.

(Third Embodiment)

As described above, in the sliding type stroke sensor, the accumulated abrasion power may adversely affect the relationship between the stroke of the brake pedal and the electric signals to be detected and therefore may possibly inhibit the abnormality of the stroke sensor 46 from being properly determined. In the light of this, a plurality of stroke sensors are used in a third embodiment, so that the abnormality of the stroke sensors can be easily determined. For example, if the respective electric signals of a plurality of stroke sensors are compared with each other and if the values thereof differ greatly, abnormality may be assumed to have occurred in at least one of the stroke sensors.

In addition, the stroke detected by each stroke sensor is also used in the calculation of the total target deceleration, so that the total target deceleration can be calculated accurately. The total target deceleration is calculated using the target deceleration of stroke detected by two-system stroke sensors and the target deceleration of master cylinder pressure, for instance. In this case, if the values of their electric signals or the values of their strokes differ greatly, an abnormality of either one of the sensors may be assumed.

The inventors found out a condition under which the need for carrying out the abnormal-time braking control by the stroke sensor abnormality determining apparatus having such two-system stroke sensors on the assumption that an abnormality of the stroke sensor(s) occurs is low even though the stroke (e.g., output voltages) detected by the stroke sensors fluctuate greatly when the pedaling of the brake pedal is constant.

Figure 8:
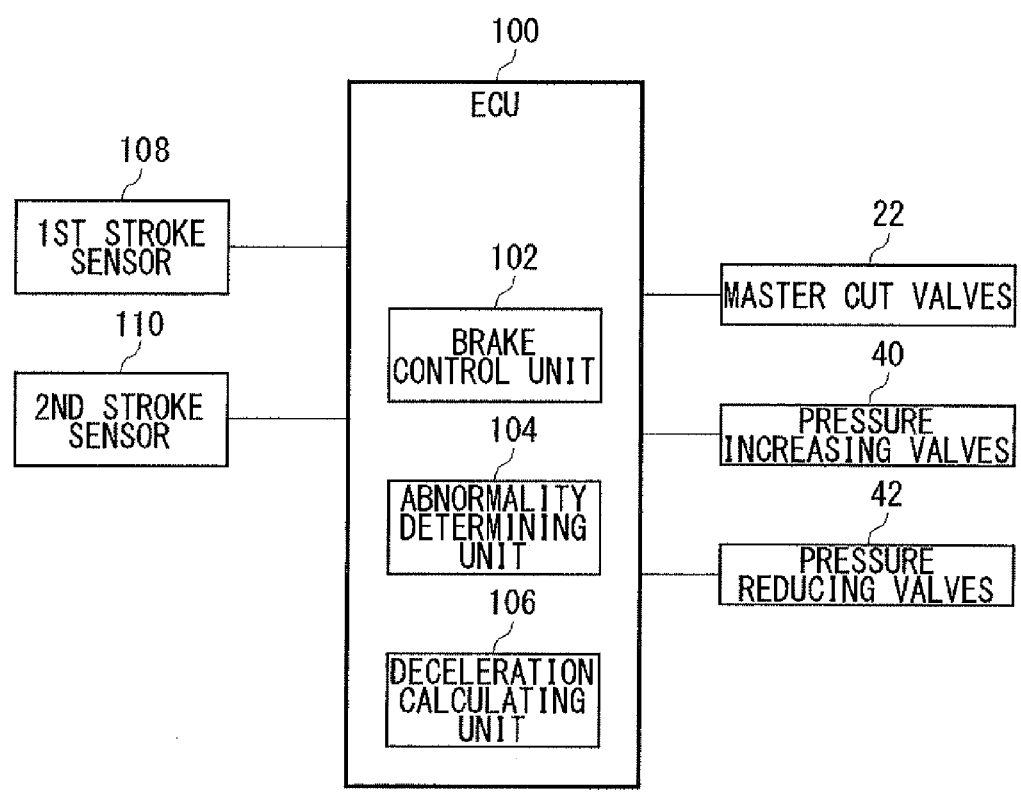
FIG. 8 is a block diagram showing a structure of a stroke sensor abnormality determining apparatus according to a third embodiment.

FIG. 8 is a block diagram showing a structure of a stroke sensor abnormality determining apparatus 300 according to a third embodiment. The stroke sensor abnormality determining apparatus 300 according to the third embodiment includes the above-described brake control unit 102, abnormality determining unit 104, deceleration calculating unit 106, a first stroke sensor 108 for detecting a first stroke $ST_1$ by detecting an electric signal that varies according to the stroke of the brake pedal, and a second stroke sensor 110 for detecting a second stroke $ST_2$ by detecting an electric signal that varies according to the stroke of the brake pedal.

Figure 9:
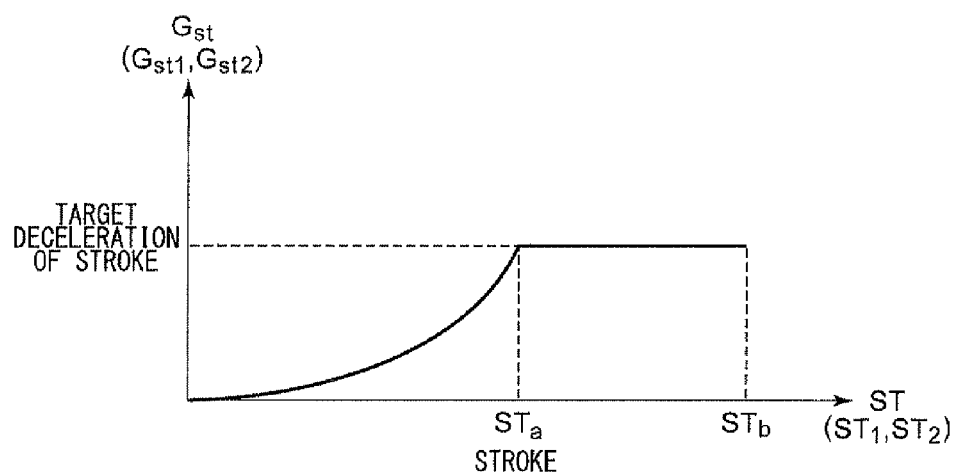
FIG. 9 is a graph showing a relationship between a stroke ST detected by each stroke sensor and a target deceleration $G_{ST}$ of stroke.

FIG. 9 is a graph showing a relationship between a stroke ST detected by each stroke sensor and a target deceleration $G_{ST}$ of stroke. In the third embodiment, the relationship shown in FIG. 9 is applied to both the first stroke sensor 108 and the second stroke sensor 110. As evident from FIG. 9, a first target deceleration $G_{ST1}$ of stroke is a function of the first stroke $ST_1$, and the values of the first target deceleration $G_{ST1}$ of stroke are saturated over a certain range (STa≤ST≤STb) up to the stroke completing end. Similarly, a second target deceleration $G_{ST2}$ of stroke is a function of the second stroke $ST_2$, and the values thereof are saturated over a certain range (STa≤ST≤STb) up to the stroke completing end. Here, "being saturated" as meant herein is a condition being such that the change in each target deceleration $G_{ST}$ becomes small relative to the change in the stroke ST. More preferably, the change in each target deceleration $G_{ST}$ of stroke relative thereto is practically zero. In other words, the desired relationship is such that the target deceleration $G_{ST}$ of stroke is constant even though the stroke varies.

Where such a relationship as shown in FIG. 9 is defined between the stroke ST and the target deceleration $G_{ST}$ of stroke, the first target deceleration $G_{ST1}$ of stroke is almost constant in a certain range (Sta≤ST≤STb) even though the first stroke $ST_1$ varies. Similarly, the second target deceleration $G_{ST2}$ of stroke is almost constant in a certain range (Sta≤ST≤STb) even though the second stroke $ST_2$ varies. In these cases, even if there is a large difference in between the first stroke $ST_1$ and the second stroke $ST_2$, no large change will occur in the first target deceleration $G_{ST1}$ of stroke and the second target deceleration $G_{ST2}$ of stroke, respectively, and there will be almost no difference in between the first target deceleration $G_{ST1}$ of stroke and the second target deceleration $G_{ST2}$ of stroke. In other words, if either the first stroke sensor 108 or the second stroke sensor 110 is abnormal and if there is a large difference in between the stroke detected by the normal stroke sensor and the stroke detected by the abnormal stroke sensor, no large change will occur in the first target deceleration $G_{ST1}$ of stroke and the second target deceleration $G_{ST2}$ of stroke, respectively, and the first target deceleration $G_{ST1}$ of stroke and the second target deceleration $G_{ST2}$ of stroke will be almost identical to each other. If so, there will be almost no effect on the change and the precision in the total target deceleration $G_O$ even if the total target deceleration $G_O$ is calculated using the stroke detected by the abnormal stroke sensor. Hence, the need for changing the on-going braking control mode because of the stroke sensor being determined to be abnormal is low.

Thus, the deceleration calculating unit 106 according to the present embodiment calculates the total target deceleration $G_0$ using at least the first stroke $ST_1$ and the second stroke $ST_2$. In this case, the deceleration calculating unit 106 may calculate a target deceleration $G_{ST}$ of stroke by calculating the average of the first target deceleration $G_{ST1}$ of stroke and the second target deceleration $G_{ST2}$ of stroke.

The abnormality determining unit 104 determines whether at least one of the first stroke sensor 108 and the second stroke sensor 110 is abnormal or not, based on the respective electric signals detected by the first stroke sensor 108 and the second stroke sensor 110. And the abnormality determining unit 104 is configured so that a signal indicating the abnormality of the stroke sensor can be outputted if the abnormality is determined to have occurred in at least one of the stroke sensors.

Figure 10:
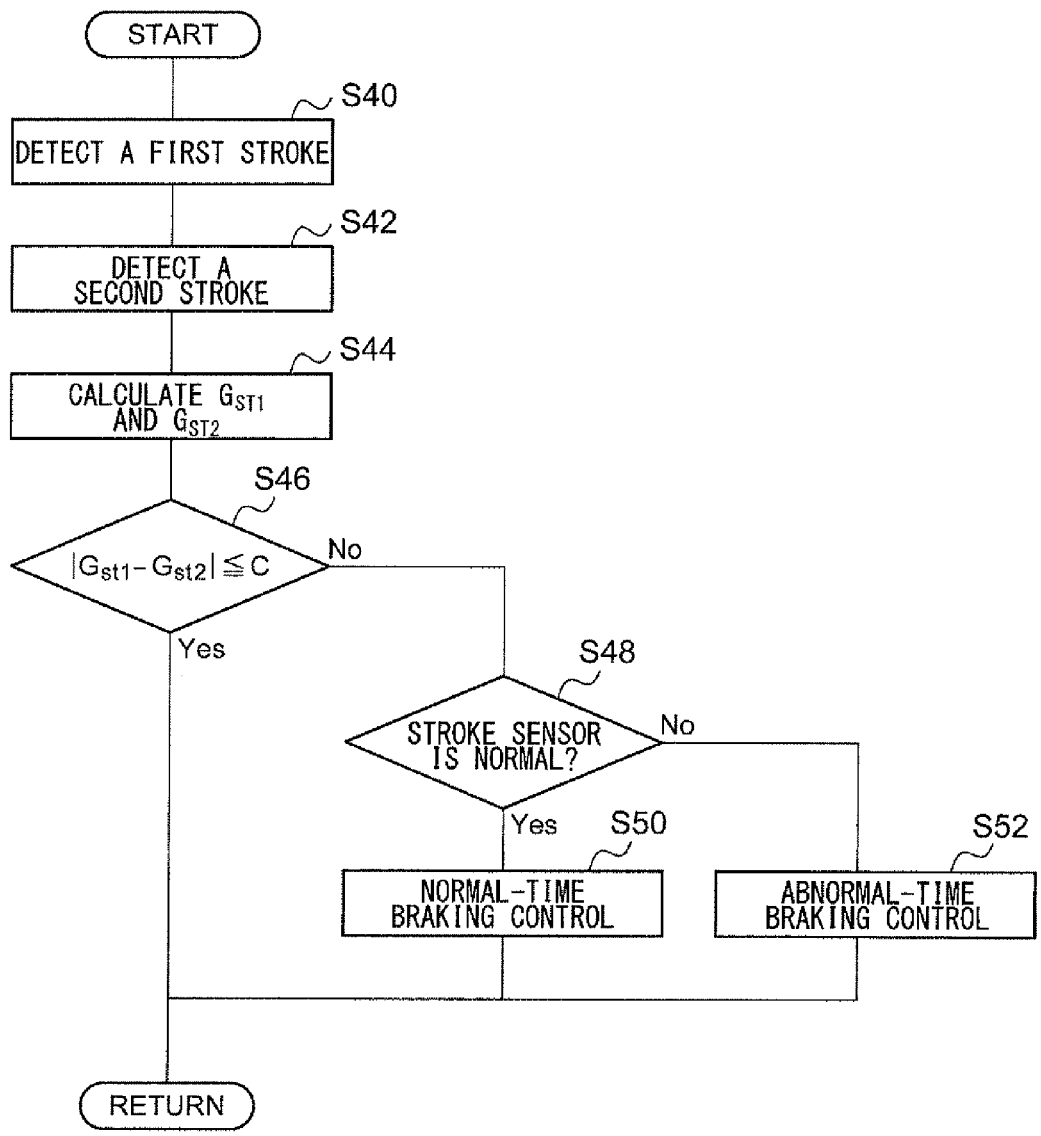
FIG. 10 is a flowchart showing a procedure of the abnormality determination on a stroke sensor carried out by a stroke sensor abnormality determining apparatus according to a third embodiment.

FIG. 10 is a flowchart showing a procedure of the abnormality determination on a stroke sensor carried out by a stroke sensor abnormality determining apparatus according to a third embodiment.

The deceleration calculating unit 106 detects the first stroke $ST_1$ and the second stroke $ST_2$ based on the values detected by the stroke sensors 108 and 110 (S40, S42). Then the deceleration calculating unit 106 calculates the first target deceleration $G_{ST1}$ of stroke and the second target deceleration $G_{ST2}$ of stroke based on the relationship, between the stroke and the target deceleration $G_{ST}$ of stroke, shown in FIG. 9 (S44).

The abnormality determining unit 104 determines whether or not the difference $|G_{ST1}-G_{ST2}|$ between the first target deceleration $G_{ST1}$ of stroke and the second target deceleration $G_{ST2}$ of stroke is less than or equal to a predetermined threshold value C (S46). If $|G_{ST1}-G_{ST2}|$ is less than or equal to the predetermined threshold value C (Yes of S46), the abnormality determining unit 104 will not determine whether or not an abnormality of each stroke sensor has occurred and will not output the signal indicating the abnormality of the stroke sensor. In so doing, the brake control unit 102 stops the processes in this flowchart of FIG. 10, for the time being, without switching to the normal-time braking control and the abnormal-time braking control.

This suppresses the unnecessary change in the braking control and reduces the strange brake feeling due to a change in the braking control, thereby contributing to further improvement of brake feeling.

Note that the predetermined threshold value C is set to a suitable value through experiments or simulation runs. For example, in consideration of the relationship between the stroke and the target deceleration of stroke, the threshold value may be set according as whether or not the change $\Delta G_0$ in the total target deceleration $G_0$ due to a change in the stroke affects the brake feeling. From such a viewpoint, the predetermined threshold value C is preferably set to "0", for instance. Even if, in such a case, fluctuations are caused in the detected stroke due to an abnormality of one of the stroke sensors, the change $\Delta G_0$ in the total target deceleration $G_0$ will be "0" in the first place. Thus, even though the brake control apparatus 10 continues to perform the braking control under the on-going control mode based on the total target deceleration $G_0$ without determining whether or not an abnormality of the stroke sensors 108 and 110, the driver will not experience a strange brake feeling due to the abnormality of the stroke sensor.

If it is determined that the difference $|G_{ST1}-G_{ST2}|$ between the first target deceleration $G_{ST1}$ of stroke and the second target deceleration $G_{ST2}$ of stroke is greater than the predetermined threshold value C (No of 546), the abnormality determining unit 104 will determine whether or not an abnormality of the stroke sensors 108 and 110 occurs, similarly to Step S20 of the first embodiment (S48). If it is determined that the both stroke sensors 108 and 110 are normal (Yes of S48), the brake control unit 102 will carry out the normal-time braking control (S50). If it is determined that there has occurred an abnormality of at least one of the stroke sensors 108 and 110 (No of S48), the brake control unit 102 will carry out the abnormal-time braking control (S52).

The present invention is not limited to the above-described embodiments only, and those resulting from any combination of the embodiments are also effective as embodiments. Also, it is understood by those skilled in the art that various modifications such as changes in design may be added to the embodiments based on their knowledge and embodiments added with such modifications are also within the scope of the present invention.

DESCRIPTION OF THE REFERENCE NUMERALS

10 Brake control apparatus
12 Brake pedal
14 Master cylinder
20 Wheel cylinder
22 Master cut valve
24 Stroke simulator 25 Brake disk
26 Reservoir tank
44 Wheel cylinder pressure sensor
46 Stroke sensor
48 Master pressure sensor
80 Hydraulic actuator
82 Resistor
82A First resistor
82S Second resistor
84 Brush
84A First brush
84B Second brush
86 First voltage detector
88 Second voltage detector
100 ECU
102 Brake control unit
104 Abnormality determining unit
106 Deceleration calculating unit
108 First stroke sensor
110 Second stroke sensor
200 Stroke sensor abnormality determining apparatus

What is claimed is:

1. A stroke sensor abnormality determining apparatus, comprising:
a stroke sensor configured to detect a stroke of a brake pedal by detecting an electric signal that varies in response to the stroke of the brake pedal;
a deceleration calculating means for calculating a total target value, which is correlated with a target deceleration of a vehicle, based on at least the stroke; and
an abnormality determining means for determining whether or not an abnormality of the stroke sensor occurs, based on the electric signal detected by the stroke sensor, the abnormality determining means being configured so that a signal indicating the abnormality of the stroke sensor can be outputted when the abnormality is determined to have occurred in the stroke sensor,
wherein, when a change in the total target value relative to a change in the stroke is less than or equal to a predetermined threshold value, the abnormality determining means does not output the signal indicating the abnormality of the stroke sensor.

2. A stroke sensor abnormality determining apparatus, comprising:
a stroke sensor configured to detect a stroke of a brake pedal by detecting an electric signal that varies in response to the stroke of the brake pedal;
a deceleration calculating means for calculating a total target value, which is correlated with a target deceleration of a vehicle, based on at least the stroke; and
an abnormality determining means for determining whether or not an abnormality of the stroke sensor occurs, based on the electric signal detected by the stroke sensor, the abnormality determining means being configured so that a signal indicating the abnormality of the stroke sensor can be outputted when the abnormality is determined to have occurred in the stroke sensor,
wherein, when a function, correlated with the stroke, whose degree of contribution to the calculation of the total target value is less than or equal to a predetermined rate, the abnormality determining means does not output the signal indicating the abnormality of the stroke sensor.

3. A stroke sensor abnormality determining apparatus according to claim 2, wherein the deceleration calculating means adds up a first target value and a second target value at predetermined rates applied thereto, respectively, according to a condition, by using the first target value calculated based on the electric signal detected by the stroke sensor and the second target value calculated based on an electric signal detected by another sensor different from the stroke sensor, and
wherein, when the rate of the first target value used in calculating the total target value is a less than or equal to a predetermined threshold value, the abnormality determining means does not output the signal indicating the abnormality of the stroke sensor.

4. A stroke sensor abnormality determining apparatus according to claim 3, wherein the another sensor is a master pressure sensor for detecting the pressure of a master cylinder that generates a fluid pressure according to the stroke of the brake pedal.

5. A stroke sensor abnormality determining apparatus, comprising:
a first stroke sensor configured to detect a first stroke of a brake pedal by detecting an electric signal that varies in response to the stroke of a brake pedal;
a second stroke sensor configured to detect a second stroke of the brake pedal by detecting an electric signal that varies in response to the stroke of the brake pedal;
a deceleration calculating means for calculating a total target value, which is correlated with a target deceleration of a vehicle, based on at least the first stroke and the second stroke; and
an abnormality determining means for determining whether or not there occurs an abnormality of at least one of the first stroke sensor and the second stroke sensor occurs, based on the electric signals detected by the first stroke sensor and the second stroke sensor, respectively, the abnormality determining means being configured so that a signal indicating the abnormality of the stroke sensor can be outputted when the abnormality is determined to have occurred in at least one of the first stroke sensor and the second stroke sensor,
wherein the deceleration calculating means calculates a first target value, which is a function of the first stroke, whose saturation is at least defined and a second target value, which is a function of the second stroke, whose saturation is at least defined, and
wherein, when a difference between the first target value and the second target value is less than or equal to a predetermined threshold value, the abnormality determining means does not output the signal indicating the abnormality of the stroke sensor.

* * * * *